(12) United States Patent
Gupta et al.

(10) Patent No.: US 10,389,130 B2
(45) Date of Patent: Aug. 20, 2019

(54) ELECTRICAL ASSEMBLY (71) Applicant: General Electric Technology GmbH, Baden (CH)

(72) Inventors: Robin Gupta, Stafford (GB); Robert Whitehouse, Stafford (GB)

(73) Assignee: General Electric Technology GmbH, Baden (CH)

( * ) Notice: Subject to any disclaimer, the term of this patent is extended or adjusted under 35 U.S.C. 154(b) by 0 days.

(21) Appl. No.: 16/081,092

(22) PCT Filed: Feb. 23, 2017

(86) PCT No.: PCT/EP2017/054196
§ 371 (c)(1),
(2) Date: Aug. 30, 2018

(87) PCT Pub. No.: WO2017/148794
PCT Pub. Date: Sep. 8, 2017

(65) Prior Publication Data
US 2019/0081481 A1   Mar. 14, 2019

(30) Foreign Application Priority Data
Feb. 29, 2016 (GB) .................................. 1603482.9

(51) Int. Cl.
*H02J 3/36* (2006.01)
*H02M 7/00* (2006.01)
(Continued)

(52) U.S. Cl.
CPC ............... *H02J 3/36* (2013.01); *H02M 7/003* (2013.01); *H02M 7/483* (2013.01);
(Continued)

(58) Field of Classification Search
CPC ............. H02M 1/4216; H02M 1/4233; H02M 7/2173; H02M 7/2176; H02M 7/23; H02M 2007/4835
(Continued)

(56) References Cited

U.S. PATENT DOCUMENTS 8,994,232 B2   3/2015   Armschat et al.
2008/0037298 A1   2/2008   Lafontaine
(Continued)

FOREIGN PATENT DOCUMENTS

EP   2454794 A2   5/2012
GB   2310553 A   8/1997
(Continued)

OTHER PUBLICATIONS

Great Britain Search Report and Written Opinion dated Aug. 18, 2016 which was issued in connection with GB patent application No. 1603482.9 which was filed on Feb. 29, 2016.
(Continued)

*Primary Examiner* — Gary A Nash
(74) *Attorney, Agent, or Firm* — Eversheds Sutherland (US) LLP (57) ABSTRACT

An electrical assembly includes a power converter having first and second DC terminals which are connectable to a DC electrical network. The power converter also includes converter limbs connected between the first and second DC terminals. Each converter limb includes an AC terminal that is connectable to a respective AC phase of a multi-phase AC electrical network. Each converter limb also includes limb portions, each connected between a corresponding AC terminal and a respective one of the first and second DC terminals. Each limb portion includes switching element(s). The electrical assembly includes a single grounding circuit having a reactor configured to provide a current path for
(Continued)

alternating current with a high impedance to ground and a current path for direct current with a low impedance to ground. The grounding circuit is arranged so that only one of the AC phases is connected to ground via the grounding circuit.

8 Claims, 5 Drawing Sheets

(51) Int. Cl.
    *H02M 7/483*     (2007.01)
    *H02M 7/217*     (2006.01)
    *H02M 1/12*     (2006.01)

(52) U.S. Cl.
    CPC ...... *H02J 2003/365* (2013.01); *H02M 7/2173* (2013.01); *H02M 7/2176* (2013.01); *H02M 2001/123* (2013.01); *H02M 2007/4835* (2013.01); *Y02E 60/60* (2013.01)

(58) Field of Classification Search
    USPC ................................ 363/67, 68, 70, 127, 129
    See application file for complete search history.

(56) References Cited

U.S. PATENT DOCUMENTS

| | | | |
|---|---|---|---|
| 2011/0317460 A1* | 12/2011 | Garces Rivera | H02M 7/48 363/127 |
| 2012/0002454 A1 | 1/2012 | Kuboyama et al. | |
| 2013/0063989 A1* | 3/2013 | Jiang-Hafner | H01H 33/596 363/52 |
| 2013/0128629 A1* | 5/2013 | Clare | H02J 3/36 363/35 |
| 2013/0182467 A1 | 7/2013 | Cross et al. | |
| 2013/0200859 A1* | 8/2013 | Jiang-Hafner | H02M 7/483 320/166 |

FOREIGN PATENT DOCUMENTS

| | | |
|---|---|---|
| JP | 2012125055 A | 12/2010 |
| WO | 2012041544 A1 | 4/2012 |
| WO | 2015024950 A1 | 2/2015 |
| WO | 2015036457 A1 | 3/2015 |

OTHER PUBLICATIONS

International Search Report and Written Opinion dated May 4, 2017 which was issued in connection with PCT application No. PCT/EP2017/054196 which was filed on Feb. 23, 2017.

* cited by examiner

ELECTRICAL ASSEMBLY

FIELD OF INVENTION

This invention relates to an electrical assembly, in particular an electrical assembly for use in a high voltage direct current power transmission network.

BACKGROUND OF THE INVENTION

In power transmission networks alternating current (AC) power is typically converted to direct current (DC) power for transmission via overhead lines and/or under-sea cables. This conversion removes the need to compensate for the AC capacitive load effects imposed by the transmission line or cable, and thereby reduces the cost per kilometer of the lines and/or cables. Conversion from AC to DC thus becomes cost-effective when power needs to be transmitted over a long distance.

The conversion of AC power to DC power is also utilized in power transmission networks where it is necessary to interconnect AC electrical networks operating at different frequencies. In any such network, converters are required at each interface between AC and DC power to effect the required conversion, and one such form of converter is a power converter, more specifically a voltage source converter.

SUMMARY

According to an aspect of the invention there is provided an electrical assembly including a power converter having first and second DC terminals connectable to a DC electrical network; and a plurality of converter limbs connected between the first and second DC terminals, Each converter limb includes a respective AC terminal connectable to a respective AC phase of a multi-phase AC electrical network; and first and second limb portions, each limb portion connected between the corresponding AC terminal and a respective one of the first and second DC terminals, each limb portion including at least one switching element. The electrical assembly includes a single grounding circuit that includes a reactor configured to provide a current path for alternating current with a high impedance to ground and a current path for direct current with a low impedance to ground, the grounding circuit being arranged so that only one of the AC phases is connected to ground via the grounding circuit.

Since only one of the AC phases is connected to ground via the grounding circuit, the remaining AC phases are not connected to ground via the grounding circuit.

Connecting only one of the AC phases to ground via the grounding circuit means that the grounding circuit is connected between ground and a potential point, wherein the potential point lies between the AC network and the AC terminal corresponding to the AC phase that is connected to the grounding circuit.

The reactor of the grounding circuit is configured to provide a current path with a high impedance to ground for alternating current, e.g. the fundamental frequency (which is typically 50 or 60 Hz) of the AC electrical network and a low impedance path to direct current.

Figure 3:
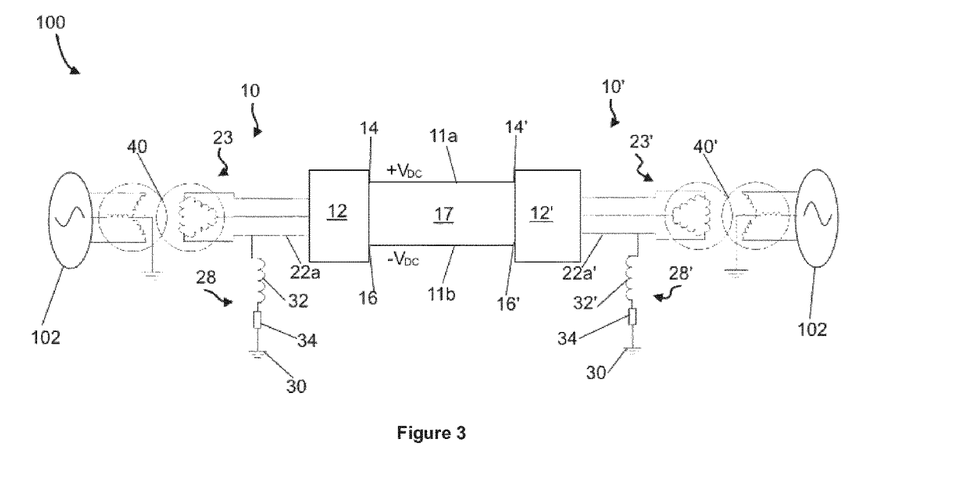
FIG. 3 shows a schematic view of a power transmission network including an electrical assembly according to a further embodiment of the invention.
Figure 4:
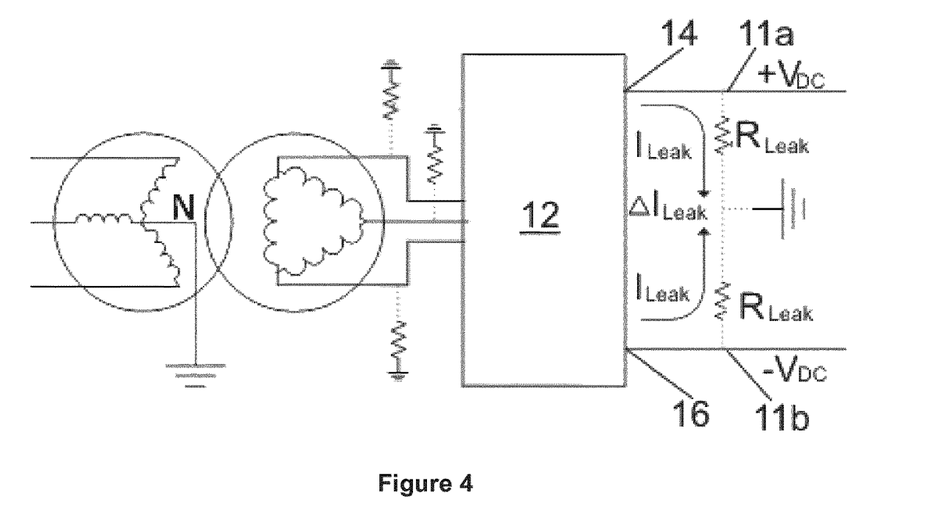
FIG. 4 illustrates schematically the occurrence of leakage current at first and second DC terminals of a power converter.

As shown at FIGS. 3 and 4, during operation of a power converter 12 a leakage current $I_{Leak}$ may be present at each DC terminal 14, 16 due to, e.g. the presence of a current path associated with an insulator of a DC power transmission line 11a, 11b that is connected to each DC terminal 14, 16. The leakage current $I_{Leak}$ flows through a leakage resistance $R_{Leak}$ and thus a leakage voltage is created. Since the magnitude of the leakage current $I_{Leak}$ present at one DC terminal 14, 16 may not be equal to the magnitude of the leakage current $I_{Leak}$ present at the other DC terminal 14, 16, a voltage unbalance between the voltages $+V_{DC}$, $-V_{DC}$ at the first and second DC terminals 14, 16 can occur. Such a voltage unbalance is undesirable because it may result in DC stress on the power converter 12 transformer and insulation stress on other system components, and thus can lead to damage of one or more such components of the electrical assembly.

It is therefore desirable to balance the voltages $+V_{DC}$, $-V_{DC}$ at the first and second DC terminals 14, 16.

The grounding circuit provides a route to ground for the difference in leakage current. Accordingly, since the extent of balance between the voltages of the DC power transmission lines is dictated by the impedance of the grounding circuit and the magnitude of the difference in leakage current present between the first and second DC terminals, the desired voltage balancing of the voltages at the DC terminals can be achieved without interfering with the operation of the AC electrical network.

Moreover, only one of the AC phases needs to be connected to ground via the grounding circuit to provide a desired current path and to balance the voltages at the DC terminals. In particular, only one of the AC phases needs to be connected to ground via the grounding circuit to permit the difference in leakage current to flow through the grounding circuit to ground in order to balance the voltages at the DC terminals.

Having only one of the AC phases connected to ground via the grounding circuit means that only one reactor is required, thus reducing the overall cost of the electrical assembly and increasing the reliability of the electrical assembly, while still providing an effective way to balance the voltages at the DC terminals.

In contrast, an assembly that includes one or more grounding circuits that are arranged to connect all of the AC phases to ground via the or each grounding circuit, e.g. as shown in EP 2 454 794 B1, is disadvantageous because such an assembly has an increased number of components. As such, connecting all of the AC phases to ground via the or each grounding circuit increases the cost and footprint of such an assembly and the assembly may also be less reliable due to the higher number of components.

Since the reactor of the grounding circuit is configured to provide a current path with a high impedance to ground for alternating current, a low (close to zero) current can flow through the grounding circuit due to the AC voltage of the corresponding AC phase and any third harmonic voltage present due to the power converter operation. Although the flow of current through the grounding circuit can result in unbalance between the AC phases, due to the grounding circuit being connected to only one of the AC phases, such unbalance is negligible due to the low (close to zero) level of the current.

During the routing of the difference in leakage current via the grounding circuit to ground, the presence of leakage current in the remaining converter limbs (i.e. the or each converter limb that is connected to an AC phase which is not connected to ground via the grounding circuit) may lead to an unbalance across all of the converter limbs. However, any such leakage current is negligible (in the range of 10 mA to 1 A) such that any unbalance created by the leakage current levels in the remaining converter limbs does not significantly affect the operation of the power converter.

The grounding circuit may include a single reactor or a plurality of reactors connected in series or parallel.

Optionally the grounding circuit further includes a resistor connected with the reactor. The resistor may be configured to damp oscillations present between the capacitance of the power converter and/or the capacitance of a power transmission medium connected to the power converter and the inductance of the grounding circuit.

The inclusion of such a resistor achieves attenuation of oscillations when an internal resistance of the reactor is not sufficient to damp the oscillations which might result in undesirable operation such as distortion in converter voltage and current.

In embodiments of the invention, the grounding circuit may include any number of reactors and/or resistors connected in parallel and/or series (or any other combination) with one another so as to achieve the desired reactance and resistance values e.g. multiple reactors may be connected in parallel between one of the AC phases and ground.

In further embodiments of the invention, at least one of the limb portions may include at least one module, the or each module including a plurality of switching elements and at least one energy storage device, each switching element and the or each energy storage device in the or each module arranged to be combinable to selectively provide a voltage source.

Preferably at least one of the limb portions includes a plurality of series-connected modules. Such an arrangement of series-connected modules defines a chain-link converter.

The structure of the chain-link converter permits build-up of a combined voltage across the chain-link converter, which is higher than the voltage available from each of its individual modules, each providing its own voltage into the chain-link converter. In this manner switching of the or each switching elements in each module causes the chain-link converter to provide a stepped variable voltage source, which permits the generation of a voltage waveform across the chain-link converter using a stepwise approximation. As such the chain-link converter is capable of providing a wide range of complex voltage waveforms.

In other embodiments of the invention the or each module may include a pair of switching elements connected in parallel with an energy storage device in a half-bridge arrangement to define a 2-quadrant unipolar module that can provide a zero or positive voltage source and can conduct current in two directions.

In still other embodiments of the invention the or each module may include two pairs of switching elements connected in parallel with an energy storage device in a full-bridge arrangement to define a 4-quadrant bipolar module that can provide a negative, zero or positive voltage and can conduct current in two directions.

Such an arrangement of the or each module readily permits generation of the aforementioned stepped voltage waveform.

Optionally the power converter includes three converter limbs, the respective AC terminal of each converter limb being connectable to a respective phase of a three-phase AC electrical network.

BRIEF DESCRIPTION OF THE INVENTION

There now follows a brief description of preferred embodiments of the invention, by way of non-limiting examples, with reference being made to the following figures in which.

DETAILED DESCRIPTION

Figure 1:
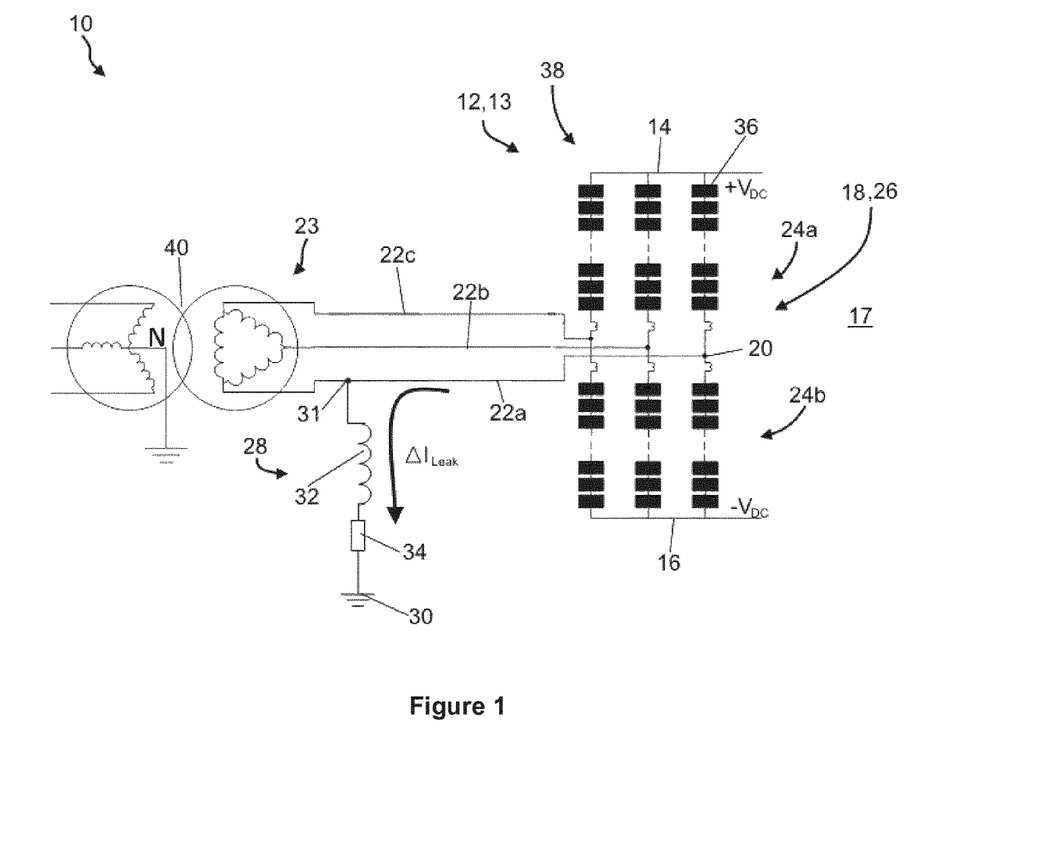
FIG. 1 shows a schematic view of an electrical assembly according to an embodiment of the invention.

An electrical assembly according to a first embodiment of the invention is shown in FIG. 1 and is designated generally by reference numeral 10.

The electrical assembly includes a power converter 12, more specifically a voltage source converter 13, which has first and second DC terminals 14, 16. The first and second DC terminals 14, 16 are connectable in use to a DC electrical network 17.

The power converter 12 also includes three converter limbs 18 that are each connected between the first and second DC terminals 14, 16. Each converter limb 18 includes a respective AC terminal 20 which is connectable in use to a respective AC phase 22a, 22b, 22c of a three-phase AC electrical network 23.

In other embodiments of the invention (not shown) the power converter 12 may have two converter limbs 18 or may have more than three converter limbs 18.

Each converter limb 18 also includes first and second limb portions 24a, 24b. Each limb portion 24a, 24b is connected between the corresponding AC terminal 20 and a respective one of the first and second DC terminals 14, 16. Each limb portion 24a, 24b includes at least one switching element 25.

The electrical assembly 10 further includes a single grounding circuit 28 that is arranged to connect only one of the AC phases 22a to ground 30. The grounding circuit 28 is connected between ground 30 and a potential point 31, wherein the potential point 31 lies between the AC network and the AC terminal 20 corresponding to the AC phase 22a that is connected to the grounding circuit 28.

The remaining two AC phases 22b, 22c are not connected to ground via the grounding circuit 28.

The grounding circuit 28 includes a single reactor 32 which is configured to provide a current path for alternating current with a high impedance to ground 30 and a current path for direct current with a low impedance to ground 30. More specifically, the reactor 32 is configured to provide a current path with a high impedance to ground 30 for the fundamental frequency (i.e. 50 or 60 Hz) of an AC voltage of the AC electrical network 23. It is envisaged that, in other embodiments of the invention, the reactor 32 may be configured to provide a current path with a high impedance to ground for alternating current at other frequencies.

In other embodiments of the invention (not shown) the grounding circuit 28 may include more than one reactor 32. In one such embodiment, the grounding circuit 28 may include multiple reactors 32 that are connected in parallel between one of the AC phases 22a and ground 30.

The current path for direct current provided by the reactor 32 is configured to direct a difference in leakage current $\Delta I_{Leak}$ that is present between the first and second DC terminals 14, 16 to flow through the grounding circuit 28 to ground 30.

In this regard, details of the occurrence of a leakage current $I_{Leak}$ at the first and second DC terminals 14, 16 is shown in FIGS. 3 and 4. In particular, during operation of a power converter 12 a leakage current $I_{Leak}$ may be present at each DC terminal 14, 16 due to, e.g. the presence of a current path associated with an insulator of a DC power transmission line 11a, 11b that is connected to each DC terminal 14, 16. The leakage current $I_{Leak}$ flows through a leakage resistance $R_{Leak}$ and thus a leakage voltage is created. Since the magnitude of the leakage current $I_{Leak}$ present at one DC terminal 14, 16 may not be equal to the magnitude of the leakage current $I_{Leak}$ present at the other DC terminal 14, 16, a voltage unbalance between the voltages $+V_{DC}$, $-V_{DC}$ at the first and second DC terminals 14, 16 can occur. Such a voltage unbalance is undesirable because it may result in DC stress on the power converter 12 transformer and insulation stress on other system components It is therefore desirable to balance the voltages $+V_{DC}$, $-V_{DC}$ at the first and second DC terminals 14, 16.

The grounding circuit 28 further includes a resistor 34 that is connected in series between the reactor 32 and ground 30. The resistor 34 is configured to damp oscillations that are present between the capacitance of the power converter 12 (e.g. cable capacitance, module capacitance etc.) and the inductance of the grounding circuit 28. The resistor 34 is also configured to damp oscillations that are present between the capacitance of the DC power transmission lines 11a, 11b and the inductance of the grounding circuit 28.

The resistor 34 may instead be connected with the reactor 32 in another way, such as between the reactor 32 and the AC phase 22a to which the grounding circuit 28 is connected.

It is envisaged that the grounding circuit 28 may include a plurality of resistors 34. Moreover, the grounding circuit 28 may include a plurality of reactors 32 and a plurality of resistors 34 that are connected in parallel and/or series with one another so as to achieve the desired resistance and reactance values.

The reactor 32 is an inductor coil that is rated to have a high value of electrical reactance. Preferably the electrical reactance of the reactor 32 is in the order of a few thousand Henry (H). For example, the electrical reactance may be in the region of 2,000 to 3,000 H.

Such a high electrical reactance means that a potentially low (close to zero) current flows through the grounding circuit 28 due to the AC voltage of the corresponding AC phase and any third harmonic voltage present because of the operation of the power converter 12. However, as mentioned earlier in this specification, any voltage unbalance between the AC phases created by the grounding circuit 28 being connected to only one AC phase 22a is negligible.

Figure 2A:
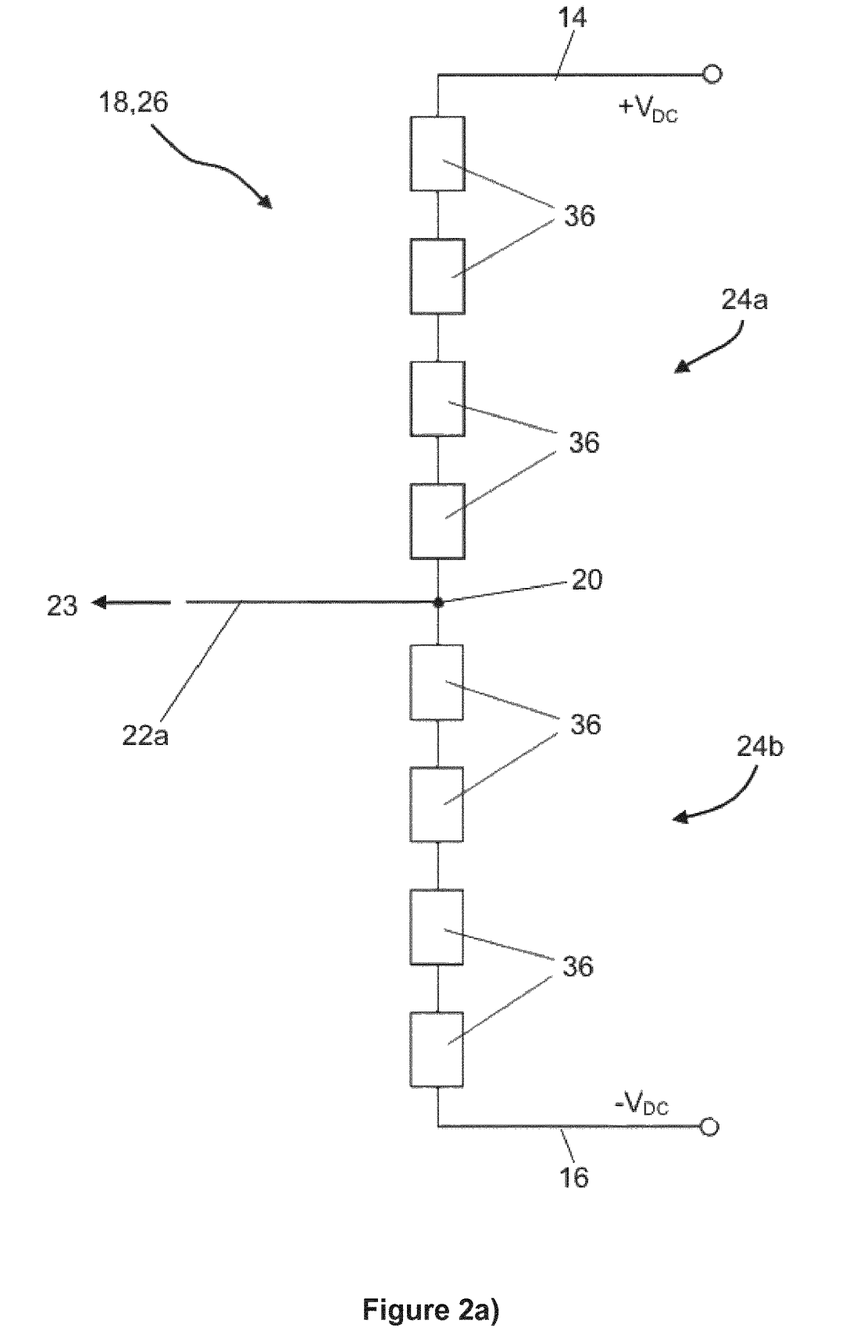
FIG. 2a) shows a schematic view of a chain-link converter limb of the electrical assembly shown in FIG. 1.
Figure 2B:
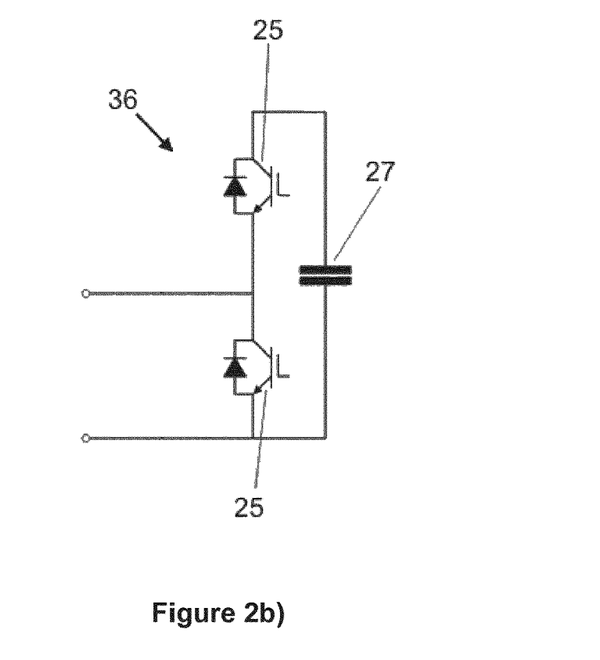
FIG. 2b) shows a schematic view of an example of a module of the chain-link converter limb shown in FIG. 2a)
Figure 2C:
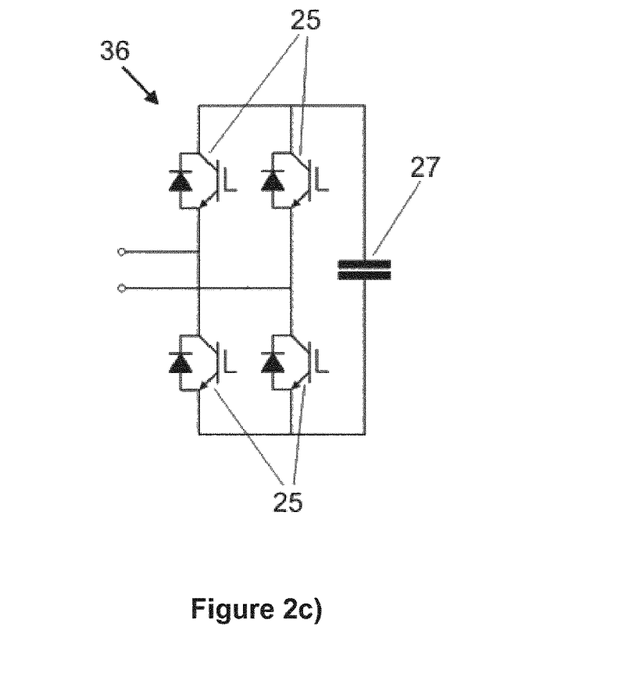
FIG. 2c) shows a schematic view of another example of a module of the chain-link converter limb shown in FIG. 2a)

In the embodiment shown, each limb portion 24a, 24b of each converter limb 18 includes a plurality of series connected modules 36 defining a chain-link converter limb 26 as shown in more detail in FIG. 2a). More specifically, and as shown in FIGS. 2b) and 2c), each module 36 includes a plurality of switching elements 25 and a plurality of energy storage devices, such as capacitors, 27. Each switching element 25 and each energy storage device 27 in each module 36 is arranged to be combinable to selectively provide a voltage source. As such, the arrangement of the power converter 12 defines a chain-link converter 38.

The structure of the chain-link converter 38 permits build-up of a combined voltage across the chain-link converter 38, which is higher than the voltage available from each of its individual modules 36, each providing its own voltage into the chain-link converter 38. In this manner switching of the switching elements 25 in each module 36 causes the chain-link converter 38 to provide a stepped variable voltage source, which permits the generation of a voltage waveform across the chain-link converter 38 using a stepped approximation. As such the chain-link converter 38 is capable of providing a wide range of complex voltage waveforms.

Each module 36 may include a pair of switching elements 25 connected in parallel with an energy storage device 27 in a half-bridge arrangement to define a 2-quadrant unipolar module that can provide a zero or positive voltage source and can conduct current in two directions, as shown in FIG. 2b).

Alternatively, each module 36 may include two pairs of switching elements 25 connected in parallel with an energy storage device 27 in a full-bridge arrangement to define a 4-quadrant bipolar module that can provide a negative, zero or positive voltage and can conduct current in two directions, as shown in FIG. 2c).

It will be understood that in other embodiments of the invention only one limb portion 24a, 24b of each converter limb 18 may include one or more modules 36.

In the embodiment shown the AC electrical network 23 includes a transformer 40, in particular a three-phase transformer 40. The transformer 40 couples each AC terminal 20 to another component of the AC electrical network 23, such as an AC grid (not shown in FIG. 1).

In use, the grounding circuit 28 provides a current path for alternating current with a high impedance to ground 30, and a current path for direct current with a low impedance to ground 30. As such, the grounding circuit 28 provides a route to ground 30 for a direct current, e.g. a difference in leakage current $\Delta I_{Leak}$ between the first and second DC terminals 14, 16, while effectively inhibiting alternating current from flowing therethrough.

A power transmission network 100 according to another embodiment of the invention is shown in FIG. 3 and includes first and second electrical assemblies 10, 10'.

Each of the first and second electrical assemblies 10', 10 includes the features as described hereinabove in relation to the electrical assembly 10 according to the first embodiment of the invention.

The first DC terminals 14, 14' of each power converter 12, 12' are interconnected by a first DC power transmission line 11a and the second DC terminals 16, 16' of each power converter 12, 12' are interconnected by a second DC power transmission line 11b.

In addition, each AC electrical network 23, 23' includes an AC grid 102 which is coupled to each AC terminal 20, 20' via a respective transformer 40, 40'.

The power transmission network 100 shown in FIG. 3 is configured as a symmetrical monopole scheme, although it will be understood that other schemes are possible. In the power transmission network 100, the first DC power transmission line 11a takes a positive DC voltage $+V_{DC}$ with respect to ground 30 while the second DC power transmission line 11b takes a negative DC voltage $-V_{DC}$ with respect to ground 30. Ideally, the positive and negative DC voltages $+V_{DC}$, $-V_{DC}$ are symmetrical about the ground 30 and thus are balanced.

As described above in relation to FIG. 4, in reality a leakage current $I_{Leak}$ may occur which can create a voltage unbalance between the positive and negative DC voltages $+V_{DC}$, $-V_{DC}$ of the DC power transmission lines 11a, 11b.

Each of the grounding circuits 28, 28' provides a current path for alternating current with a high impedance to ground 30, and a current path for direct current with a low impedance to ground 30. As such, each of the grounding circuits 28, 28' provides a route to ground 30 for the difference in leakage current $\Delta I_{Leak}$, thus balancing the voltages of the DC power transmission lines 11a, 11b.

The invention claimed is:

1. An electrical assembly comprising:
   a power converter including:
   first and second DC terminals connectable to a DC electrical network;
   a plurality of converter limbs connected between the first and second DC terminals, each converter limb including:
      a respective AC terminal connectable to a respective AC phase of a multi-phase AC electrical network; and
      first and second limb portions, each limb portion connected between the corresponding AC terminal and a respective one of the first and second DC terminals, each limb portion including at least one switching element;
   wherein the electrical assembly includes a single grounding circuit that includes a reactor configured to provide a current path for alternating current with a high impedance to ground and a current path for direct current with a low impedance to ground, the grounding circuit being arranged so that only one of the AC phases is connected to ground via the grounding circuit.

2. An electrical assembly according to claim 1, wherein the grounding circuit further includes a resistor connected with the reactor.

3. An electrical assembly according to claim 2, wherein the resistor is configured to damp oscillations present between the capacitance of the power converter and/or capacitance of a power transmission medium connected to the power converter and the inductance of the grounding circuit.

4. An electrical assembly according to claim 1, wherein at least one of the limb portions includes at least one module, the or each module including a plurality of switching elements and at least one energy storage device, each switching element and the or each energy storage device in the or each module arranged to be combinable to selectively provide a voltage source.

5. An electrical assembly according to claim 4, wherein at least one of the limb portions of each converter limb includes a plurality of series-connected modules.

6. An electrical assembly according to claim 4, wherein the or each module includes a pair of switching elements connected in parallel with an energy storage device in a half-bridge arrangement to define a 2-quadrant unipolar module that can provide a zero or positive voltage source and can conduct current in two directions.

7. An electrical assembly according to claim 4, wherein the or each module includes two pairs of switching elements connected in parallel with an energy storage device in a full-bridge arrangement to define a 4-quadrant bipolar module that can provide a negative, zero or positive voltage and can conduct current in two directions.

8. An electrical assembly according to claim 1, wherein the power converter includes three converter limbs, the respective AC terminal of each converter limb being connectable to a respective phase of a three-phase AC electrical network.

* * * * *